3,440,736
APPARATUS FOR THE TREATMENT OF
LENGTHS OF MATERIALS
Hans Fleissner and Heinz Fleissner, Egelsbach, near
Frankfurt am Main, Germany, assignors to Vepa
AG, Basel, Switzerland
Filed May 2, 1967, Ser. No. 635,480
Claims priority, application Germany, May 2, 1966,
A 52,336; June 16, 1966, V 52,762
Int. Cl. F26b 11/02, 13/00, 11/04
U.S. Cl. 34—115                                40 Claims

ABSTRACT OF THE DISCLOSURE

The present disclosure relates to apparatus for the treatment of materials, for example the drying, heat-setting and steaming of textile materials wherein the treated material can be continuously produced at an improved capacity and with a required minimum width. More particularly, the present disclosure concerns a method and apparatus for the heat-treatment of textile materials wherein the material being treated is held against the conveying surfaces thus preventing the material from shrinking.

BACKGROUND OF THE INVENTION

The present invention relates to a process and apparatus for the continuous treatment, preferably heat-treatment, for example drying, heat-setting and steaming lengths of materials wherein the treatment medium is passed through the materials being treated, said material being supported and guided on conveying means, for example sieve drums, subjected to a suction draft. More particularly, the present invention concerns a process and apparatus for the continuous treatment of materials wherein said materials are prevented from shrinking in width by forcing them against the sieve drum jacket or by holding them by holding means resting against said sieve drum.

Apparatus with sieve drums subjected to a suction draft are well known. In devices of this type the material to be processed is held to the sieve drums by the suction draft only, and passed through the treatment chamber by the rotation of the sieve drums. The sieve drums may by arranged in one horizontal or one vertical row or in two rows staggered with respect to each other. In general, with these devices the sieve drums are only partially covered with the material being treated. Baffle means disposed in the interior of the sieve drums interrupt the suction draft at those portions of the sieve drums which are not covered with the material being treated. In many cases, especially when processing delicate textile materials, the sieve drums are covered with fine wire meshes which are fastened to the sieve drums. By using powerful suction drafts, the material is firmly forced against the sieve drum and/or the wire mesh cover. Width shrinkage of the material is thus substantially impeded. However, in many cases full shrinkage of the material, expecially in the longitudinal direction, is desirable. With sieve drums this is readily achieved by driving the inlet elements for example a pair of rollers or an intake belt at a higher speed than the first sieve drum so that the material is overfed to the first sieve drum. Thus it is possible to guide the material on the sieve drums absolutely tensionless in the longitudinal direction, allowing the material to fully shrink. Also it has been suggested to obtain an overfeed in the feeding direction by designing the pair of inlet rollers accordingly, for example as multi-cambered rolls. However, such an overfeed is generally not required.

In contrast thereto, it is important for many commission finishers that the material have a certain minimum final width. Up to now this could only be obtained by using stenters wherein the material being treated is held at the edges by heavy pins or clip chains and is passed through the machine freely hanging. In this machine considerable shrinkage forces occur. Also the chains are susceptible to trouble and require a considerable amount of service. Another disadvantage is that in the stenter processing only surface ventilation is possible whereas with sieve drums the treatment medium is passed through the material by means of a suction draft and thus substantially higher capacities can be reached.

SUMMARY OF THE INVENTION

Accordingly, it is an object of the present invention to avoid these prior art disadvantages in the treatment of lengths of materials, for example textile materials.

Another object of the present invention is to provide an improved process and apparatus for the treatment of materials wherein required minimum widths at a very high capacity and with a gentle material treatment can be readily obtained.

A further object of the present invention is to provide an improved process and apparatus for the continuous treatment, preferably for the heat-treatment, for example drying, heat-setting and steaming, of lengths of materials wherein the material length is held at its edges at least during the treatment stage during which time the material being treated tends to shrink.

A still further object of the present invention is to provide an improved process and apparatus for the treatment of textile materials wherein the material being treated is held to the surface of the conveying means, for example sieve drums, by a suction draft and also by continuous holding means, for example, belts, cords, and the like, which are guided in a tensioned state over guide rollers.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Pursuant to the present invention, it has been found that the above-mentioned disadvantages may be eliminated in a much improved process and apparatus for the treatment of materials for example textile materials, may be obtained if the material being treated is held to the conveying surface, for example at its edges, at least during a portion of the treatment stage. Thus the material being treated can be prevented from shrinking in width by forcing it against the sieve drum jacket or by holding it by holding means, for example, belts, cords, and the like, which rest against the sieve drum. For carrying out the process of the present invention it is desirable to use an apparatus containing at least one sieve drum equipped with a means for producing a suction draft wherein the material being treated is drawn to the sieve drum jacket. According to the present invention the apparatus is provided with following, endless holding means, for example belts, strands, and the like, which are guided in a tensioned state over rolls which force the edges of the material length against the sieve drum surface. Tests have indicated that it is sufficient to force the fabric edges against the sieve drum by using these belts which are subjected to a certain initial stress in order to avoid, with the additional help of the suction draft, material shrinkage in the width. It has been found that part of the shrinkage forces are compensated for by the suction draft which forces the fabric against the sieve drum. Also, in order to avoid additional tensile stress exerted on the material due to the weight of said material and the flattering of said material caused by the air flow, it is advantageous that the material being treated adheres to the sieve drum surface.

For commission finishes it is important that the apparatus is adaptable for processing different material widths. For achieving this purpose and in a further embodiment of the present invention it is suggested to adjustably guide the endless holding means.

In order to allow material shrinkage in the warp direction (longitudinal direction) it is furthermore suggested not to hold the material by means of the holding means immediately at the inlet, but rather to arrange the holding means is such a way that it becomes effective only later in the process. Thus the holding means when seen in the direction of material passage is supported by the sieve drum only after the material has already been supported. It has been advantageously found that the zone in which the material is held and guided on the sieve drums by the suction draft only should not be longer than the zone in which the material is heated up. Thus the zone between the material inlet and the point at which the holding means becomes effective should be equal to or smaller than the heating up zone. This is particularly important for processes involving fiber setting using hot air or steam, since in this case the heating-up time and thus the heating-up zone is very short. In the case of drying, where the material is fed to the apparatus in a wet condition, the heating-up zone is substantially longer.

An effective design of the apparatus of the present invention results if only one holding element is adustable in the direction of the drum axis, preferably the holding element which is situated at the operating side. In many cases however, it is more advantageous if both or all of the continuous holding means are arranged adjustably in the direction of the drum axis. Thus, it is possible to displace the holding means jointly, for example by a joint adjusting shaft, which is provided at both ends with a counterthread. However, in many cases it is more effective to design the holding means in such a way that they can be adjusted independently of each other. With this arrangement the holding means can be adjusted automatically by means of a device which controls the edges of the material length. In order to always force the holding means against the sieve drum with a certain initial stress, it is expedient to make the holding means of an elastic material or to tension them elastically.

According to the present invention it is suggested to drive the holding means by the frictional force of the conveying means, for example the sieve drums. For especially delicate materials and high treatment requirements it is often more expedient to associate an independent drive means with the holding means. The adhesion of the holding means against the sieve drum and/or the sieve drum cover can be increased if the holding means are provided with a coating which increases adhesion. Instead of a special coating, for example when metal strips are used as holding means, the adhesion can also be increased when the supporting side is roughened. When using several sieve drums, the two sides would have to be roughened.

When considerable shrinkage forces occur, as for example with certain synthetic fibers, it is frequently desirable to provide the holding means at the supporting side with holding parts, for example pins or hooks, and to design these holding parts in such a way that they extend through the fabric and/or the material to be held and engage with the perforations in the sieve drum and/or with the fine wire mesh cover disposed thereon. This anchoring means renders impossible a sliding of the holding means on the sieve drum, even if considerable shrinkage forces occur.

The belt-shaped holding means can generally be very narrow and may have a width of for example about 10–15 mm. The holding means thus come into contact with the selvages only and do not in any way affect the treatment of the fabric. In the case of material without selvages it is, according to another embodiment of the present invention, also possible to provide the holding means laterally with holding parts, for example pins or hooks for receiving and/or pinning-up the fabric. In this embodiment of the invention the fabric is not covered by the holding means but rather the holding means rest directly on the sieve drum or the wire mesh cover on the sieve drum. Also, it is advantageous to design the holding parts, for example the pins of the holding means, in such a way that they penetrate the material to be held and engage with the perforations of the sieve drums or the covers on the sieve drums. With this particular design of the holding means it is possible to use only one continuous holding means or belt on each side of the conveying means even if several sieve drums one behind the other are used. When several sieve drums are used the hooks penetrate the material and engage with the wire mesh cover or the perforations of the sieve drum, from above, and at the subsequent sieve drum the material is reversed and thus the holding means, for example the belts, rest on the drum and the hooks penetrate the material from below. Because of the suction draft the material being treated is firmly held by the hooks. With strong shrinkage forces it is also possible to provide hooks on the other side of the belt, which then engage with the perforations and/or the wire mesh on the drum and thus fix the position of the belt on the sieve drums.

In order to ensure shrinkage of the material overfed to the sieve drums and held to the sieve drums by the holding means and also held beneath the holding means, it is suggested according to another embodiment of the present invention to provide the increased adhesive force, for example the adhesive coating, the pins or the roughening of the holding means, on the holding means only at certain locations so that the continuous holding means have a plurality of zones with a high adhesion which are arranged at predetermined distances from each other and dispersed with intermediate zones of low adhesion which allows shrinkage of the material being treated even under the holding means. It is also advantageous to make the holding means of a wire netting which has a rough surface by its structure and thus offers good adhesion.

The continuous holding means are guided on a plurality of rollers. For adjusting it is necessary to provide for guide rolls which have a guide groove for the holding means. The adjustable guide rolls are provided near the drum at least at the point where the belt and/or the holding means are supported. However, it is also possible to provide a plurality of guide rolls distributed over the circumference of the drum.

In another feature of the present invention wherein the material being treated is guided on only one side of several sieve drums, it is suggested to provide at least one guiding element for the holding means and/or the material being treated at the point of passage between two sieve drums. In an apparatus comprising several sieve drums wherein the material being treated is held and guided on alternate sides of adjacent sieve drums it is desirable to hold and guide the material at the material edge at both sides between the holding elements since in this case the holding means may be designed as simple belts or strands.

In an apparatus with a larger number of sieve drums it is generally not necessary to provide all of the sieve drums with holding means. Usually it is sufficient to provide holding means for only the first or the first few sieve drums where the material undergoes it greatest shrinkage. In many cases this applies to the first few sieve drums of the apparatus.

A simple and safe bearing and adjustment can be achieved if the adjustable guide rolls are slidably supported on a stationary axis. Adjustment of the guide rolls may preferably be effected by means of an adjusting shaft which is driven by a servomotor and arranged at a certain distance paraxially to the stationary axis. However, it is also possible to operate the adjusting shaft by means of a hand wheel.

Adjustment of the belts and/or cords for the respective fabric widths, can in accordance with the present invention be avoided, if as a means to prevent shrinkage, a tensioned sieve netting belt of a stiff material extending over the entire width of the sieve drum is used. Between the sieve netting belt and the sieve drum, material lengths of any width can be processed, which are prevented from shrinking by the firm adherence of the sieve netting belt against the sieve drum. The guidance of this sieve netting belt corresponds to the guidance of individual belts. The sieve netting belt may, for example, be made of wire.

BRIEF DESCRIPTION OF THE DRAWINGS

The present invention will become fully understood from the detailed description hereinbelow and the accompanying drawings which are given by way of illustration only and are not limitative of the present invention and wherein.

DESCRIPTION OF THE PREFERRED EMBODIMENTS

Figure 1:
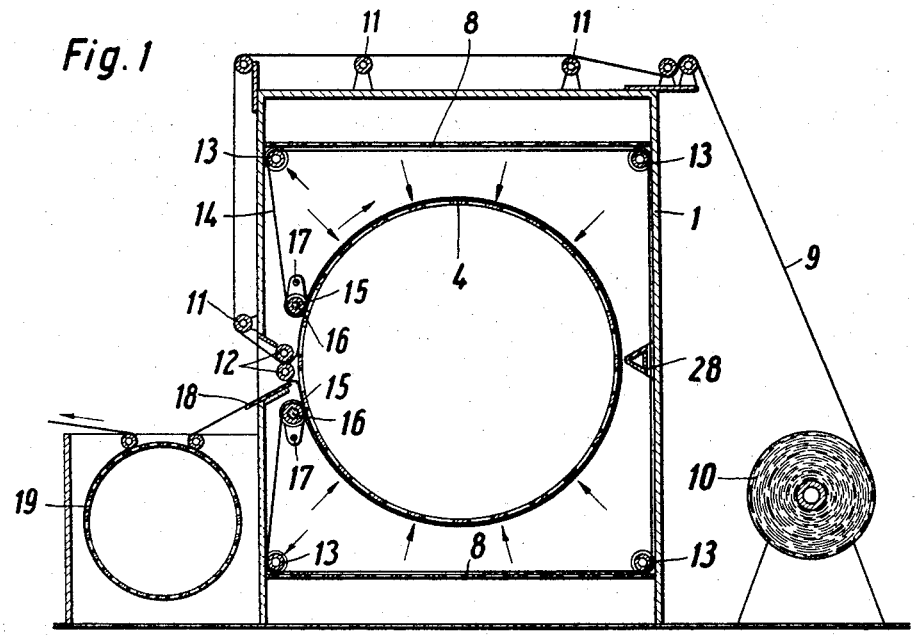
FIGURE 1 is a longitudinal sectional view of the apparatus of the present invention comprising only one sieve drum as the conveying means.

The apparatus of the present invention comprises a heat-insulated housing 1 which is subdivided by a partition 2 into a treatment chamber 3 with one or several sieve drums 4 and into a fan chamber 5 with fan wheels 6 correlated to each sieve drum. Above and below the fan wheels a heating device 7 is disclosed for heating up the treatment medium. For equalizing the air, steam, or other treatment medium drawn out of the sieve drums by the fan wheels, sieve sheets 8 are provided above and beneath the sieve drums. Because of the suction draft, the material 9 to be processed is forced firmly against the sieve drums and held by said sieve drums.

In the embodiment of the present invention according to FIGURE 1, a material length 9, for example a fabric, is drawn off a beam 10 and passed over rolls 11 to a pair of intake rollers 12. In front of the intake rollers an edge uncurler and an expander (not shown) may be provided. Several types of these devices are well known and they can be readily obtained. The speed of the pair of intake rollers 12 is infinitely variable independent of the sieve drum. Thus it is possible to supply the material 9 with any desired and/or required overfeed to the sieve drum 4 where it is held to the sieve drum jacket by the suction draft.

In FIGURE 1, continuous belts 14 which are guided on rolls 13 are provided for holding the material being treated to the sieve drum. One or several of the rolls 13 may be adjustably and resiliently supported in order to force the belts 14 with an initial stress against the sieve drum 4. On the sieve drum, guide rolls 15 which are slidably supported on a stationary axis 16 and which can be adjusted by means of an adjusting shaft 17 are provided at the supporting point of the belts 14. Such guide rolls may also be provided near the outlet. The support and adjustment is the same. In the embodiment according to FIGURE 1 the drum is almost completely embraced by the material. Therefore, it is not necessary to provide a baffle in the sieve drum for interrupting the suction draft at that portion of the sieve drum which is not covered with the material being treated. The outlet in the present embodiment is provided with a chute 18. The material is then conveyed on a cooling drum 19 to a batching installation (not shown), or to the next treatment device. A protrusion 28 separates the air which is returned at the top and at the bottom into the treatment chamber 3.

Figure 2:
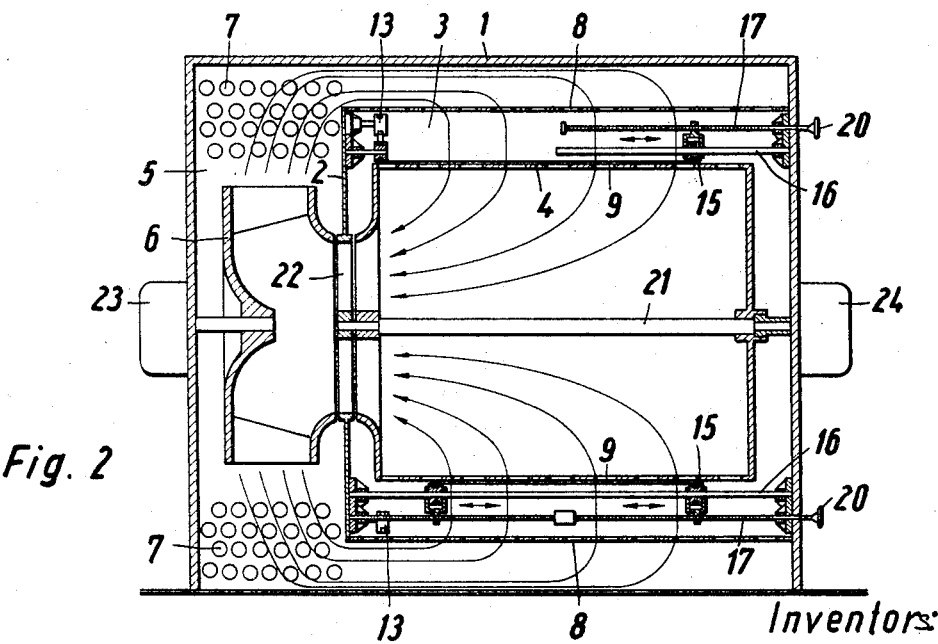
FIGURE 2 is a cross sectional view of a sieve drum dryer used in FIGURE 1.

In the embodiment of the present invention according to the upper portion of FIGURE 2 only the belt 14 situated at the operating side is adjustable by means of the guide rolls 15. On the fan side, the belt 14 is held in a predetermined position by rolls 13.

In the embodiment according to the lower portion of FIGURE 2 the two belts 14 are adjustably supported on axis 16 by means of the appertaining guide rolls 15. By means of counter-threads on adjusting shaft 17 the two guide rolls 15 may be moved towards or away from each other. The adjusting shaft is operated by means of a hand wheel 20. Instead of the hand wheel a servomotor may be provided which is operated automatically by an edge control device and which adjusts the guide rolls and thus the belt 14 as soon as this is necessary, depending upon the material width.

According to FIGURE 2 the sieve drums are supported on a stationary axis 21 which in turn in supported in a cast-iron spider 22 at one side of the apparatus and in the housing 1 at the other side. Drives 23 and 24 for the fan wheels and the sieve drums are mounted to housing 1. In the other embodiments of the present invention, axis 21 is not shown in order to simplify the explanation thereof.

Figure 3:
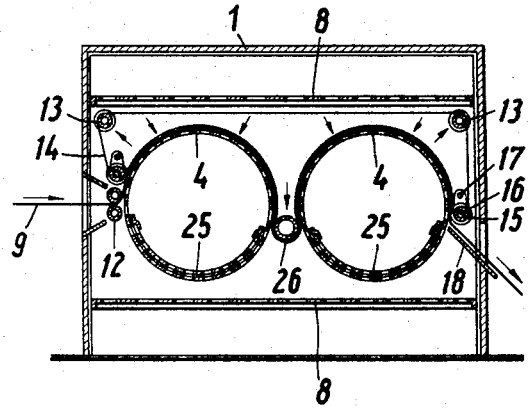
FIGURE 3 is a longitudinal sectional view of the apparatus of the present invention comprising two sieve drums.
Figure 4:
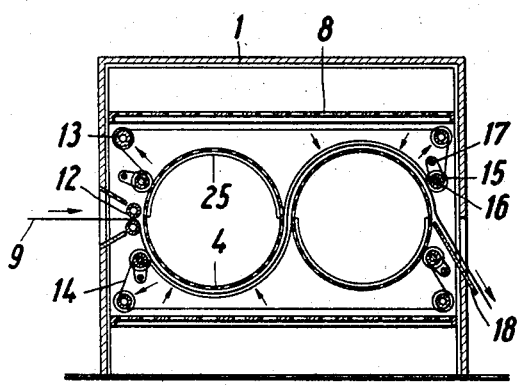
FIGURE 4 is a longitudinal sectional view of another embodiment of the present invention comprising two sieve drums.
Figure 5:
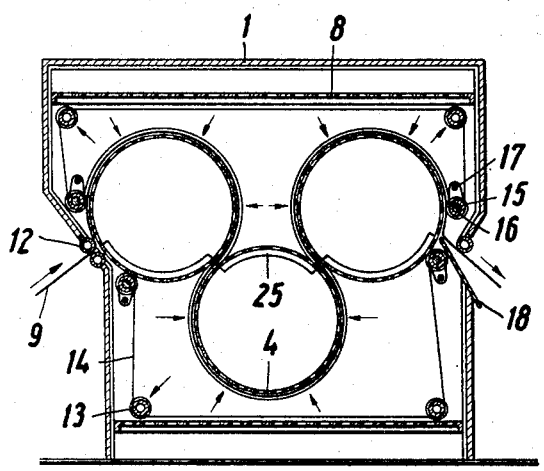
FIGURE 5 is a longitudinal sectional view of the apparatus of the present invention comprising three sieve drums.

In the embodiment of the present invention according to FIGURE 3 two sieve drums are provided. However, with this embodiment any desired number of sieve drums can be used. By the "add-a-unit" system it is possible to enlarge the apparatus of the present invention as desired. In this embodiment the sieve drums are only partially covered with the material being treated. At that portion of the sieve drum which is not covered with the material being treated a baffle 25 is provided in the sieve drum. As shown in FIGURE 3, the baffle may comprise two curved perforated sheets. By displacing these sheets with respect to each other it is possible to completely or only partially cover the perforations and thus to establish any desired suction draft at this side of the sieve drum or alternately to interrupt the suction draft completely. However, it is also possible as indicated in FIGURES 4 and 5, to provide non-perforated, stationary baffles 25 in the sieve drums. In the embodiment according to FIGURE 3 a roller 26 is arranged between the sieve drums for guiding material 9 and belts 14. In this apparatus the material is guided on the upper side of the drums only. This arrangement offers the advantage that the holding belts 14 need only be provided at the upper side of the sieve drums. Also, this embodiment can be used for processing materials which may only be supported unilaterally during the suction draft treatment.

In the apparatus according to FIGURE 4 the material is reversed when being passed from one sieve drum to the next sieve drum. For a secure holding of the material, two separate belts 14 are provided on each side of the apparatus. Supporting, guiding and adjusting these belts 14 is accomplished in the same manner as described in the embodiments of FIGURES 1 and 2. The arrows in the drawings pointing to the rolls 13 indicate that the rolls are supported, adjustably in the direction of the arrows in order to allow re-tensioning of the belts 14. These rolls may also be resiliently supported in the direction of the arrows.

In FIGURE 5, an embodiment with the sieve drums in staggered arrangement is shown. The material is held and guided just as in devices with the drums arranged in a line. Also with a staggered arrangement of the drums any number of sieve drums can be used.

Figure 6:
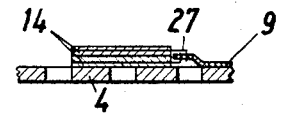
FIGURE 6 is a cross section of the holding means of the present invention.

FIGURE 6 shows a section of an embodiment of the holding means. In this embodiment two belts 14 are provided which have hook-like bent pins 27, by which the material 9 is held on the sieve drum 4.

Figure 7:
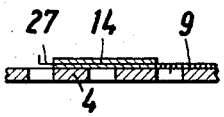
FIGURE 7 is a cross section of another type of holding means according to the present invention.

In the embodiment of the present invention according to FIGURE 7 only one belt with pins 27 is used. With this belt 14 the pins 27 are bent at both sides and the bent end portions are so long that they extend through the fabric and/or the material 9 and into the perforations of the sieve drum, or if a wire mesh cover is provided, into the wire mesh. When the belt is reversed when being passed from one sieve drum to the next one, the other bent end portions of pins 27 engage with the wire mesh cover so that sliding is safely avoided even if large shrinkage forces occur. Other embodiments of the holding means are also feasible.

With the apparatus of the present invention not only fabrics and knit goods, but also fleeces, carpets, nonwovens and other lengths of material which tend to shrink can be advantageously treated.

Since modifications of this invention will be apparent to those skilled in the art, it is not desired to limit the invention to the exact constitution shown and described. Accordingly, all suitable modifications and equivalents may be resorted to which fall within the scope of the appended claims.

We claim:

1. An apparatus for the treatment of materials which comprises a substantially closed housing, at least one conveying means rotatably disposed within said housing, inlet means for introducing the material to be treated to said conveying means, means for producing a suction draft, said means communicating with the interior of the conveying means for holding the material being treated to said conveying means, heating means provided within the circulation zone of the treatment medium, holding means which are at least partially associated with the conveying means for holding the material being treated thereto, said holding means being provided with pins or hooks for receiving and pinning up the material being treated and outlet means for removing the material from the apparatus.

2. The apparatus of claim 1 wherein the holding means comprises continuous belts or strands which are guided over roller means.

3. The apparatus of claim 1 wherein the holding means are adjustably supported.

4. The apparatus of claim 1 wherein the holding means are associated with the surface of the conveying means only at those portions which are covered with the material being treated.

5. The apparatus of claim 2 wherein the holding means is complementary with a substantial portion of the material being treated on the surface of the conveying means.

6. The apparatus of claim 1 wherein the zone in which the material being treated is held by the suction draft only is equal to or smaller than the zone required to heat up said material.

7. The apparatus of claim 1 wherein only one of the holding means is adjustable in the direction of the drum axis.

8. The apparatus of claim 7 wherein said holding means is located at the operating side of the apparatus.

9. The apparatus of claim 1 wherein all of the continuous holding means are adjustable in the direction of the drum axis.

10. The apparatus of claim 9 wherein all of the holding means are adjustable independent of each other.

11. The apparatus of claim 2 wherein the holding means are elastically tensioned.

12. The apparatus of claim 2 wherein the holding means comprise an elastic material.

13. The apparatus of claim 1 wherein the holding means are driven by the frictional force of the conveying means or the material being treated, disposed thereon.

14. The apparatus of claim 1 wherein the holding means are driven by drive means associated therewith.

15. The apparatus of claim 1 wherein the holding means are provided with a coating which increases adhesion.

16. The apparatus of claim 1 wherein the holding means are roughened on the supporting side thereof.

17. The apparatus of claim 1 wherein the holding means is a wire mesh which is provided on the surface of the conveying means.

18. The apparatus of claim 1 wherein the hooks or pins penetrate the material being treated and engage perforations in the surface of the conveying means or the wire mesh cover on the conveying means.

19. The apparatus of claim 1, wherein the holding means are associated with the surface of the conveying means at the edges of the material being treated.

20. The apparatus of claim 1, wherein the hooks or pins are directed toward and away from the conveying means so that they penetrate the material and engage the conveying means when the holding means is reversed as it is passed from one conveying means to the next conveying means.

21. The apparatus of claim 1, wherein the holding means rests directly on the surface of the conveying means or wire mesh cover on the conveying means and are laterally provided with pins or hooks for pinning-up the material being treated.

22. An apparatus for the heat-treatment of textile materials which comprises a substantially closed housing, at least one cylindrical sieve drum means rotatably disposed within said housing, inlet means for introducing the material to be treated to said sieve drum means, means for producing a suction draft, said means communicating with the interior of said sieve drum means for holding the material being treated to said sieve drum means, heating means provided within the circulation zone of the treatment medium, holding means which are at least partially associated with the surface of said sieve drum means, said holding means comprising continuous tensioned belts or strands which are guided over adjustable guide roller means, protrusion means attached to the housing and extending to the proximity of the surface of the sieve drum means thereby dividing the housing into an upper and lower portion and outlet means for removing the material from the apparatus.

23. The apparatus of claim 22 wherein the adjustable guide roller means for the continuous belts are provided near the sieve drum means at least at the point of support of the material being treated.

24. The apparatus of claim 22 wherein a plurality of guide roller means are distributed over the surface of the sieve drum means.

25. The apparatus of claim 22 comprising at least two sieve drum means, wherein the material is guided on the same side of each sieve drum means, said sieve drum means being provided with at least one guiding element for supporting the material being treated and for supporting the holding means between two sieve drum means at the point of material passage.

26. The apparatus of claim 22 comprising at least two sieve drum means wherein the material being treated is guided on alternate sides of two adjacent sieve drum means, said material being held and guided bilaterally between surface-complementary holding means.

27. The apparatus of claim 22 comprising at least two sieve drum means wherein only some of said sieve drum means are provided with holding means.

28. The apparatus of claim 22 wherein the guide roller means are slidably supported on a stationary axis.

29. The apparatus of claim 22 wherein the guide roller means are adjusted by means of an adjusting shaft.

30. The apparatus of claim 29 wherein the adjusting shaft is driven by a servomotor.

31. The apparatus of claim 29 wherein the adjusting shaft is operated by a hand wheel.

32. The apparatus of claim 22 wherein the holding means is a wire netting which extends over the whole working width of the sieve drum means.

33. The apparatus of claim 22 wherein said inlet and outlet means comprise roller means associated with the surface of the sieve drum means.

34. The apparatus of claim 33, wherein said outlet means comprises cooling drum means which provides a conveying surface for the material removed from the apparatus.

35. The apparatus of claim 34 wherein chute means are provided between the outlet roller means and the cooling drum means.

36. The apparatus of claim 22, wherein the tensioned belts or strands are provided with pins or hooks for receiving and pinning-up the material being treated.

37. The apparatus of claim 36, wherein the pins or hooks penetrate the material being treated and engage perforations in the surface of the sieve drum means or the wire mesh cover on the sieve drum means.

38. The apparatus of claim 36, wherein the tensioned belts or strands rest directly on the surface of the sieve drum means or the wire mesh cover disposed on the sieve drum means and are laterally provided with pins or hooks for pinning-up the material being treated.

39. The apparatus of claim 36, wherein the hooks or pins are directed toward and away from the sieve drum means so that they penetrate the material and engage the sieve drum means when the tensioned belts or strands are reversed as they are passed from one conveying means to the next conveying means.

40. The apparatus of claim 22, wherein the holding means are associated with the surface of the conveying means at the edges of the material being treated.

References Cited

UNITED STATES PATENTS

| 2,054,391 | 9/1936 | Schmidt | 34—116 XR |
| 3,332,155 | 7/1967 | Daufenbach | 34—115 |

FOREIGN PATENTS

| 931,343 | 10/1947 | France. |
| 942,578 | 11/1963 | Great Britain. |

KENNETH W. SPRAGUE, *Primary Examiner.*

U.S. Cl. X.R.

34—158